July 11, 1933.                F. TUTTLE                1,917,408
FILM GATE FOR MOTION PICTURE APPARATUS
Filed Oct. 1, 1930
Fig.1.    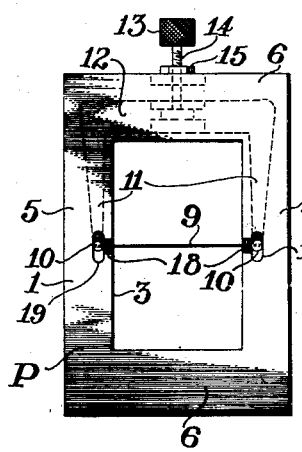    Fig.2.    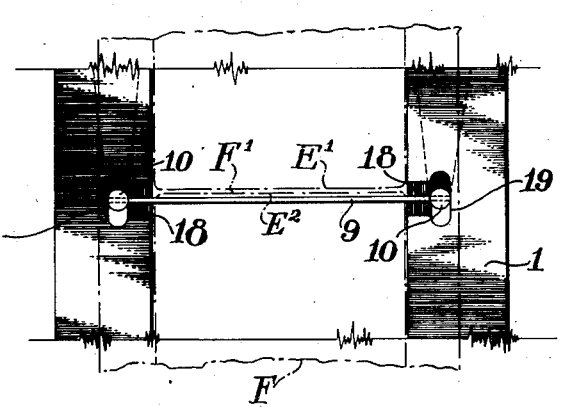
Fig.3.    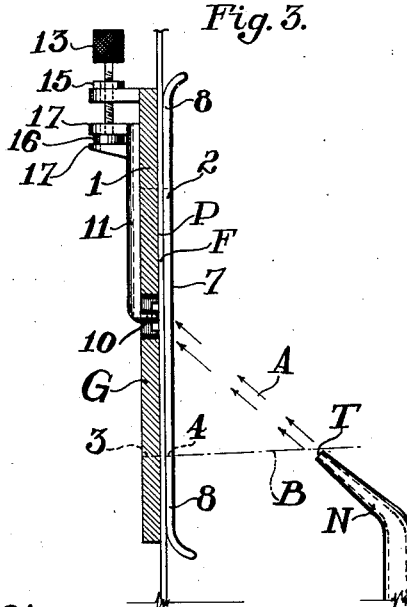    Fig.4.
Fig.7.    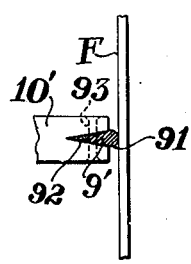    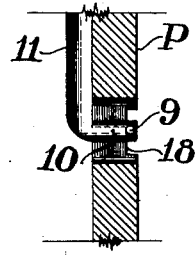    Fig.5.

Inventor
Fordyce Tuttle,
Attorneys

Patented July 11, 1933

1,917,408

UNITED STATES PATENT OFFICE

FORDYCE TUTTLE, OF ROCHESTER, NEW YORK, ASSIGNOR TO EASTMAN KODAK COMPANY, OF ROCHESTER, NEW YORK, A CORPORATION OF NEW YORK

FILM GATE FOR MOTION PICTURE APPARATUS

Application filed October 1, 1930. Serial No. 485,640.

This invention relates to photography, and more particularly to film gates for motion picture apparatus by which a section or area of photographic film may be held flat. One object of my invention is to provide a film gate particularly adapted for motion picture apparatus adapted for exposing a relatively large surface of film. Another object is to provide means for holding the film flat so that the tendency for that portion of the film which is normally unsupported to buckle or curve away from the focal plane is minimized. Another object of my invention is to provide a film gate for exposing more than one picture area of a film at a time and to provide a support at the edge of the picture area. Another object of my invention is to provide a very thin small support which may be registered with the frame line between the exposure areas and thus be invisible. Still another object of my invention is to provide a means for holding the film against the support, said means lying wholly without the exposed area of film. Other objects will appear from the following specifications, the novel features being particularly pointed out in the claims at the end thereof.

Coming now to the drawing wherein like reference characters denote like parts throughout, Figure 1 is a front plan view of one section of a film gate constructed in accordance with and embodying the preferred form of my invention.

Figure 2 is a fragmentary enlarged front elevation of a portion of the film gate shown in Figure 1.

Figure 3 is an enlarged view, partially in section and partially showing an edge view of the film gate shown in Figure 1.

Figure 4 is an enlarged detail section of the support holding yoke used with a gate as shown in the preceding figure.

Figure 5 is a diagrammatic view of an optical system which may be used in motion picture apparatus having a gate constructed in accordance with the preceding figures.

Figure 7 is an enlarged detail section showing a second embodiment of a film support which may be used in accordance with my invention.

Figure 6:
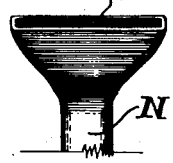
Figure 6 is a perspective showing an enlarged view of a nozzle from which air may be blown against the film.

In motion picture apparatus such as cameras, projectors, printers and the like, film may be held flat in a film gate for the taking, projecting, or printing operations. While my invention is suitable for any piece of photographic apparatus employing film, it is particularly designed for motion picture printers and projectors where a comparatively large area of film is supported by its edges in a film gate and where it is necessary to hold such a large area of film substantially in a plane.

With the new 65 and 70 mm. film and with certain of the color processes now in vogue, it is necessary in some of the operations, such as in the printing operation, to hold a comparatively large area of film flat in a film gate, and this is normally done by supporting the film by its edges and by the top and bottom lying above and below that area of film which is supported in the gate.

With a single exposure area of film in a gate this is not particularly difficult, but where more than one exposure area is exposed at a time, and where the large film areas are to be exposed, it is quite difficult to prevent the film from bending or buckling away from the focal plane when held solely by its edges.

In accordance with my invention the film gate may comprise two members 1 and 2 which may resemble the standard type of film gate except for the size.

For the purposes of illustrating my invention I have shown a gate particularly designed for exposing simultaneously two exposure areas of film. Such a film gate is frequently used for two color work.

In the present instance plates 1 and 2 are each apertured, each having a rectangular opening cut through the metal plate which forms the gate. Plate 1 is provided with an opening 3 and plate 2 is provided with an opening 4. Plates 1 and 2 may be hinged or mounted to slide relative to each other but since this forms no part of my present invention, the means for causing the plates to move together has not been shown.

The registering cut out portions 3 and 4 are substantially the same size as two picture areas on standard motion picture film, these areas being shown diagrammatically in Figure 2 by dot and dash lines. In Figure 2 the film F is provided with exposure areas E—1 and E—2 and there is between the two picture areas the usual frame line F—1. In the average motion picture the frame line varies somewhat in size but generally shows up as a narrow opaque line after the film has been printed and developed.

A film F in the gate is normally supported by the sides 5—5 and 6—6 of one section of the film gate and the sides 7—7 and 8—8 of the other section of the film gate. When supported in this manner there is quite a large area of film lying opposite the cut out portions 3 and 4 and this area is liable to bend somewhat away from the focal plane. This is particularly true when the film is in certain stages of the processes through which it is passed to produce the completed printed film.

In order to prevent the film from buckling and in order to provide a support which is not visible in the printed picture, I have provided the support shown in the drawing.

This support may conveniently consist of a small wire 9 as shown in Figure 1, this wire being stretched taut between a pair of posts 10.

The posts 10 may be formed on the ends of arms 11 which are connected at the top by means of a cross bar 12, the arms 11 and the cross bar 12 forming a yoke. This yoke is slidably mounted upon a portion of the gate in the present embodiment of my invention on the gate section 1 and may be moved by means of a knurled wheel 13.

The knurled wheel 13 is on the end of a threaded shank 14 which has a threaded engagement with the nut 15 so that as the knurled wheel turns the screw moves up and down through the nut 15. On the end of this screw there is a head 16 lying between a pair of spaced plates 17, these plates being carried by part 12 of the yoke. With this construction the arms 11 of the yoke may be moved simultaneously and to the same extent.

One side P of the film gate 1 is accurately formed to define the path of one side of the film and this in the present instance lies in a plane. It is desirable to have one edge of the support 9 lying in the same plane as one side P of the gate member 1. In order to do this there is a slideway 18 cut in the edges 5 of the gate member 1. This slideway is of sufficient depth to hold the support 9 at the proper elevation. The posts 10 extend down through slot 19 in the gate member 1 and are of such a length that they do not extend above the surface P of the gate member 1.

It is desirable to have the support 9 as thin as possible and yet strong enough to support the film in position. I have found that a fine piano wire stretched across between the arms of the yoke is entirely satisfactory. However, if desired, the support may be made of considerably wider material and still be made thin enough to prove satisfactory. As shown in Figure 7 the wire 9' is made in the form of a narrow band having a rounded outer edge 91 adapted to contact with the film surface F and having a rearwardly extending tapered portion 92 which may be held in any suitable manner as by riveting at 93 to the posts 10' of the arms 11. This type of support has the maximum strength and yet has a small cross section so that very few light rays are obstructed as they pass through the film. Any type of support may be used which has a cross section not greater than the normal frame line F' extending between the two exposure areas of a film.

With certain types of film it is only necessary to provide a support for one side of the film across the film gate because there is a normal tendency of the film to buckle always in one direction. For such film the arrangement above-described may be used.

However, it is an advantage to be able to place the film in the gate with either side toward the support and for such reasons I have provided an air blast directed toward that area of the film lying over the support 9 to hold the film against the supporting surface of the wire 9 or of the rod 91.

As indicated in Figure 3 there is a nozzle N from which a blast of air indicated by the arrows A is directed upwardly against the film F lying in the film gate.

As indicated by the fine broken line B the top T of this nozzle lies entirely below the line B and consequently is beyond the openings 3 and 4 of the film gate. Consequently light rays passing through the gate are not in any way obstructed by the nozzle N.

As indicated in Figure 6 the nozzle N is preferably provided with a broadened top T so as to direct a wide comparatively narrow blast of air toward the film where it lies over the support 9.

The exact amount of air is not particularly material. As a matter of fact, a very light air pressure is usually sufficient to flatten out the film and hold it against the support 9. There is, of course, some difference in the different types and conditions of film used, but the air pressure can readily be regulated to such a strength that the film will be properly held in position.

Referring particularly to Figure 5, my invention is shown as built into a photographic printer for two color work, in this figure there is the film gate designated broadly as G. This film gate is for exposing two areas, E—1 and E—2 of the film F held between the plates 1 and 2. Behind the film gate there may be a printing lamp L and behind the lamp L a reflector R.

Two objectives O—1 and O—2 may direct the images from the film gate G upon a second gate G—2 and the images may be focused and brought into registration in any well known manner.

With a printer constructed in accordance with this diagram there is a support lying across the center of the gate as shown in the other figures of the drawing so that the edges of each exposure frame are adequately supported on all four sides. This is quite important for color motion picture work because it tends to eliminate the blurred images due to faulty registration and to the film lying outside of the focal plane of the objective.

It is quite obvious that my invention is also particularly suitable for any motion picture film gate or any film gate in which a large area of film is supported and in which it is necessary or desirable to hold the film rigorously in a plane.

While I have described and illustrated a preferred embodiment of my invention, I claim as within the scope of my invention all such forms as may come within the limits of the following claims.

Having thus described my invention, what I claim as new and desire to secure by Letters Patent is:

1. In a film gate for motion picture apparatus, the combination with a plate for supporting a film, an opening in said plate, a support extending across the opening and dividing the opening into two parts, a yoke carrying the ends of said support, said yoke being movably mounted on the gate.

2. In a film gate for motion picture apparatus, the combination with a gate having an opening adapted to simultaneously expose two frames of a motion picture film, with a support extending across the middle of said opening adapted to support a film lying in said gate by contacting with said film between the two frames exposed at the gate, said support comprising a wire, and adjustable supports for the ends of the wire.

3. In a film gate for motion picture apparatus, the combination with a gate having an opening adapted to simultaneously expose two frames of a motion picture film, with a support extending across the middle of said opening adapted to support a film lying in said gate by contacting with said film between the two frames exposed at the gate, a mount for said support including a pair of spaced arms and means for moving the arms upon the support.

4. In a film gate for motion picture apparatus, the combination with a gate having an opening adapted to simultaneously expose two frames of a motion picture film, with a support extending across the middle of said opening adapted to support a film lying in said gate by contacting with said film between the two frames exposed at the gate, a mount for said support including a yoke slidably mounted on the gate, and a threaded device for moving the yoke.

5. In a film gate for motion picture apparatus, the combination with a plate for supporting a film and having an opening therein, a substantially plane surface defined by one side of the plate having a slideway cut therein and a support movably mounted in the slideway and having a surface substantially in the plane of one side of the plate and extending across the aperture therein and dividing said aperture into two parts.

6. In a film gate for motion picture apparatus, the combination with an apertured plate adapted to support a film, of a support extending across said aperture and dividing said aperture into two parts and means including an air blast for holding film flat against the support.

7. In a film gate for motion picture apparatus, the combination with an apertured plate adapted to support a film, of a support extending across said aperture and dividing said aperture into two parts, said apertured plate and support having surfaces lying substantially in a plane, and an air blast adapted to hold a film in the plane defined by the aperture plate and support.

8. In a film gate for motion picture apparatus, the combination with an apertured plate adapted to support a film, of a support extending across said aperture and dividing said aperture into two parts, slideways in the apertured plate to receive ends of the support, a movable member for moving the support with respect to the apertured plate, and means including an air blast to hold portions of a film in contact with said support.

9. In a film gate for motion picture apparatus, the combination with a pair of apertured plates adapted to confine film moving therebetween to a fixed path, a support extending across the aperture of one plate dividing said aperture into two parts and adapted to contact with film passing through said gate, means for movably mounting the support whereby it may be moved with respect to the apertured plates, and an adjustable member for moving the movable mount extending to one side of the gate.

10. In a film gate for motion picture apparatus, the combination with a pair of apertured plates adapted to confine film moving therebetween to a fixed path, a support extending across the aperture of one plate dividing said aperture into two parts and adapted to contact with film passing through said gate, and an air blast directed towards said support and adapted to hold film against said support.

11. In a film gate for motion picture apparatus, the combination with a pair of apertured plates, said apertures being of substantially the size of two normal exposure areas on standard motion picture film, a support extending across one aperture at approximately the center portion thereof and adapted to contact with film drawn through the gate, means for varying the location of said support and an air blast directed toward said support and adapted to hold film flat in the gate and in contact with the support.

12. In a film gate for motion picture apparatus, the combination with a plate for supporting a film, an opening in said plate, a support extending across said opening, a slideway carried by said plate and supporting said support, means carried by said plate for moving said support in said slideway whereby said support may be moved independently of said film gate.

13. In a film gate for motion picture apparatus, the combination with a pair of apertured plates adapted to confine film moving therebetween to a fixed path, a support extending across the aperture of one plate dividing said aperture into two parts, a movable member carried by said plate and being attached to said support whereby said support may be moved relative to said aperture and whereby a film may contact with said movably mounted film support in passing through said gate.

14. In a film gate for motion picture apparatus, the combination with a pair of apertured plates adapted to confine film moving therebetween to a fixed path, a support extending across the aperture of only one plate dividing one aperture into two parts and adapted to contact with film passing through said gate, a movable member supported by said plate and attached to said support whereby said support may be moved with respect to said apertured plate.

Signed at Rochester, New York this 22nd day of September, 1930.

FORDYCE TUTTLE.